United States Patent
Kawano et al.

(10) Patent No.: US 6,219,454 B1
(45) Date of Patent: Apr. 17, 2001

(54) IMAGE PROCESSING APPARATUS

(75) Inventors: Hiroyuki Kawano; Junichi Matsunoshita; Yoshiharu Hibi; Tetsushi Anabuki, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/196,160

(22) Filed: Nov. 20, 1998

(51) Int. Cl.[7] .................................................. G06K 9/36
(52) U.S. Cl. .................... 382/232; 382/166; 382/312; 382/319; 382/406; 382/426
(58) Field of Search ................................. 382/232, 166, 382/312, 319; 358/426, 406, 474, 498

(56) References Cited

U.S. PATENT DOCUMENTS

| | | | |
|---|---|---|---|
| 5,452,102 | * 9/1995 | Yokoyama | 358/426 |
| 5,463,700 | * 10/1995 | Nakazawa | 382/232 |
| 5,999,644 | * 12/1999 | Sugiura | 382/162 |
| 6,078,695 | * 6/2000 | Kadono | 382/243 |

\* cited by examiner

Primary Examiner—Jerome Grant, II
Assistant Examiner—Negussie Worku
(74) Attorney, Agent, or Firm—Oliff & Berridge, PLC

(57) ABSTRACT

Formatted code data are sequentially input to an input terminal A. A receiving section 11 passes a header portion etc. to a control section 16, and causes selection codes (output to CDS) and text color codes (output to CDC) to be stored sequentially in a storage section 15. When pattern codes are output to CDI and input to an expansion section 12b, the control section 16 reads out the selection codes and the text color codes from the storage section 15 with such timing that pixels at the same position are output simultaneously from image conversion sections 13a–13c, and inputs those codes to expansion sections 12a and 12c. The respective compressed codes are expanded by the expansion sections 12a–12c, converted by the image conversion sections if necessary, and then input to a composing section 14. At this time point, respective data corresponding to pixels are timed with each other, which allows a correct composing process to be executed in the composing section 14.

17 Claims, 14 Drawing Sheets

| PH | SH$_1$ | CODE$_{1-1}$ | CODE$_{2-1}$ | CODE$_{3-1}$ | SH$_2$ | CODE$_{1-2}$ | CODE$_{2-2}$ | CODE$_{3-2}$ | ...... | EOP |

Fig. 4A

| DSC | SOP | FLPH | PDAT$_1$ | PDAT$_2$ | ...... | PDAT$_i$ |

Fig. 4B

| SOS | FLSH | SDAT$_1$ | SDAT$_2$ | ...... | SDAT$_j$ |

Fig. 4C

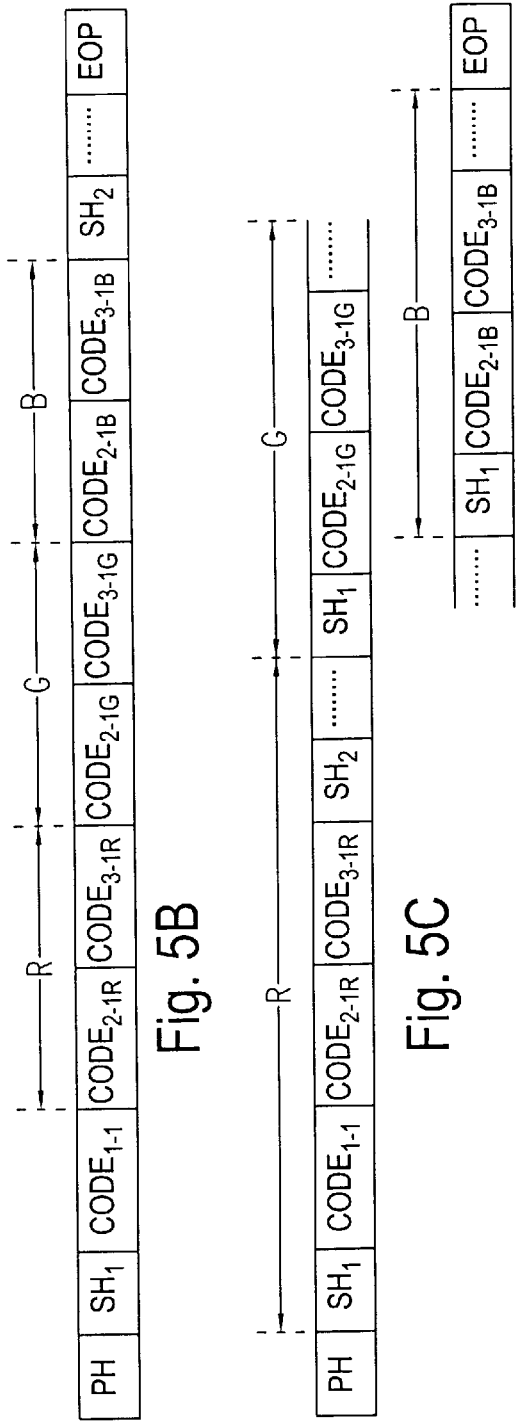

IMAGE PROCESSING APPARATUS

BACKGROUND OF THE INVENTION

The present invention relates to an image processing apparatus which composes an image while receiving first compressed data generated by compressing a first piece of image data, second compressed data generated by compressing a second piece of image data that is different from the first piece of image data, and third compressed data generated by compressing selection data to be used for making a selection between the first piece of image data and the second piece of image data. Further, the present invention also relates to color facsimile machines, or to transmission/reception of images of the Internet.

In recent years, the transmission rate of image data has increased rapidly because of development of networks such as the Internet and public lines and advancement of the image compression technology. With the increase in transmission rate, transmittable image data have been improved in resolution and increased in the number of gradation levels, and their colorization has advanced; even a full-color image of 400 dpi (dots per inch) is now a practical transmission object. Incidentally, in transmitting such a full-color image via a network or a public line, image compression is usually performed. In such a case, the JPEG algorithm is generally used as a compression algorithm. Further, image storage such as image filing is now popular, and data that have been compressed, as in the above case, by using the JPEG algorithm or the like are used for storage of color images.

Now, the JPEG algorithm will be described, starting from the compression algorithm. If necessary, input image data is subjected to color space conversion from the RGB color space to the L*a*b* space, for example. Thereafter, the image data is divided into blocks of 8×8 pixels, converted into the frequency domain by DCT (discrete cosine transform) on a block-by-block basis, and then quantized by using a quantization table having the same size as each block. Then, the block data are converted by a zigzagged scan into raster data, from which compressed data is generated by two-dimensional Huffman coding. The expansion algorithm is an algorithm reverse to the compression algorithm. Image data is restored by Huffman decoding, raster-block conversion, dequantization, and IDCT (inverse DCT).

However, since quantization, which is a non-reversible process, is performed in the JPEG algorithm as seen from the above description, an expanded image is deteriorated in image quality from image data before the compression. Usually, to increase the compression ratio, a quantization table in which the quantization step is made larger as the frequency increases is used. Therefore, in particular, the image quality deteriorates remarkably and the compression ratio decreases at portions (characters, line figures, etc.) having edges that include many high-frequency components [of large amplitudes].

SUMMARY OF THE INVENTION

The present invention has been made in view of the above circumstances, and an object of the invention is therefore to provide an image processing apparatus which enables transmission and storage of an image while maintaining high image quality, enables high-speed transmission, and can compose and reproduce an image correctly.

In the invention, compressed data generated by separating image data into a first piece of image data, a second piece of image data, and selection data to be used for making a selection between the first piece of image data and the second piece of image data and coding the respective image data are input and an image is composed and restored. The three kinds of input compressed data can be ones that have been subjected respectively to most suitable image structure conversion processes such as resolution conversion processes, color conversion processes, and compression processes in accordance with their characteristics. By composing image data by receiving compressed data that have been subjected to processes suitable for respective image data in the above manner, the amount of data that are handled at the time of transmission or storage can be reduced and high image quality can be maintained.

Where image data that have been separated in the above manner are transmitted or stored, the characteristics of a compression algorithm do not allow compressed data to be transmitted or stored on a pixel-by-pixel basis and it is necessary to transmit or store compressed data sequentially on a line-by-line basis, a stripe-by-stripe basis (each stripe consists of a plurality of lines), or a page-by-page basis. When compressed data that have been generated through compression on a predetermined unit basis are input, a possibility that pixels of the respective separated image data are obtained at the same time by simply expanding the respective compressed data at the time of composing and restoration is low and hence the original image cannot be restored by this method.

In the invention, input compressed data are temporarily stored in the storing means, or expanded data as generated by subjecting the input compressed data to expansion processes or expanded data generated by subjecting the input compressed data to the expansion processes and image conversion processes are temporarily stored in the storing means, whereby the timing of the respective image data are timed with each other at the time of composing. Alternatively, at the time of composing, previously expanded selection data may be stored in the storing means and then later expanded first and second expanded data may be combined with each other. In this case, the first and second expanded data may be combined with each other in such a manner that one of the first and second expanded data is stored in the storing means first and then the first and second expanded data are combined with each other while being timed with each other by selectively writing the other expanded data the storing means by using the selection data that is the third expanded data.

Since in the above manner the composing process can be executed while three kinds of image data are timed with each other even if they are not timed with each other at the time of input, an image can be composed correctly.

BRIEF DESCRIPTION OF THE DRAWINGS

FIGS. 4A to 4C illustrate examples of formats of data that are input to an image processing apparatus of the invention.

FIGS. 5A to 5D illustrate modified examples of formats of data that are input to an image processing apparatus of the invention.

DETAILED DESCRIPTION OF THE PREFERRED EMBODIMENTS

Figure 1:
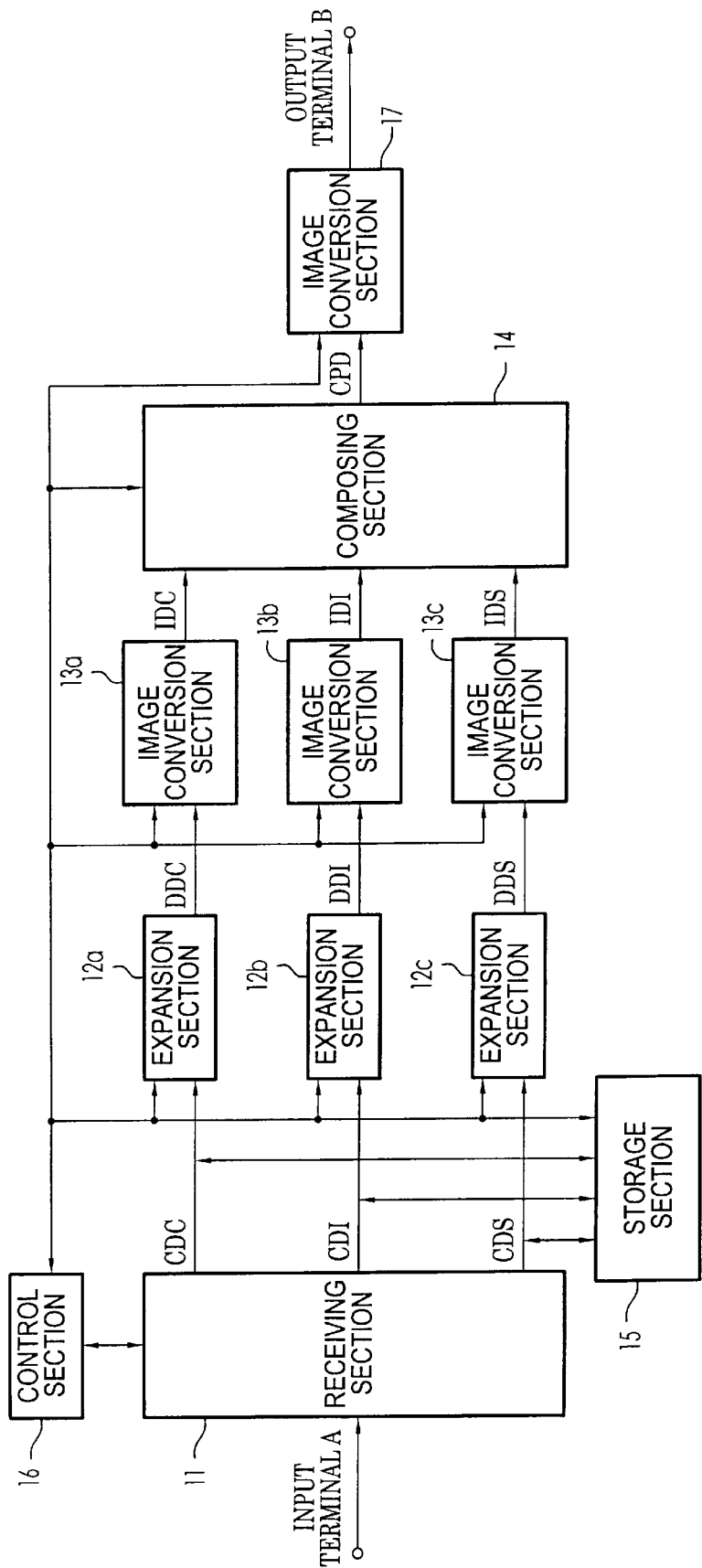
FIG. 1 shows a general configuration of an image processing apparatus according to a first embodiment of the present invention.

FIG. 1 shows a general configuration of an image processing apparatus according to a first embodiment of the present invention. In FIG. 1, 11 denotes a receiving section; 12a–12c, expansion sections; 13a–13c and 17, image conversion sections; 14, a composing section; 15, a storage section; and 16, a control section. CDC denotes a signal line for connection between the receiving section 11, the storage section 15, and the expansion section 12a. CDI denotes a signal line for connection between the receiving section 11, the storage section 15, and the expansion section 12b. CDS denotes a signal line for connection between the receiving section 11, the storage section 15, and the expansion section 12c. DDC denotes a signal line for connection between the expansion section 12a and the image conversion section 13a. DDI denotes a signal line for connection between the expansion section 12b and the image conversion section 13b. DDS denotes a signal line for connection between the expansion section 12c and the image conversion section 13c. IDC denotes a signal line for connection between the image conversion section 13a and the composing section 14. IDI denotes a signal line for connection between the image conversion section 13b and the composing section 14. IDS denotes a signal line for connection between the image conversion section 13c and the composing section 14. CPD denotes a signal line for connection between the composing section 14 and the image conversion section 17.

Upon receiving a code data transmission request from a transmission side, the receiving section 11 establishes a connection to a transmission line so as to be able to receive code data from the transmission line, and then starts to receive code data. When the reception of code data has started, the receiving section 11 confirms that the code data being received complies with a predetermined format and then receives the transmitted data. For example, in a system capable of receiving code data from a plurality of transmission lines where different communication protocols for data transmission are used as in a facsimile communication via a public line and a communication on a LAN, the receiving section 11 connects the image processing apparatus to a transmission line in a state that code data can be received after executing a communication protocol process in accordance with the transmission line, and then receives code data. When the reception of the code data has finished, the receiving section 11 terminates the connection to the transmission line by executing a transmission termination process.

As described later, transmitted data includes first compressed data generated by compressing a first piece of image data, second compressed data generated by compressing a second piece of image data, third compressed data generated by compressing selection data to be used for making a selection between the first piece of image data and the second piece of image data, and various kinds of header information including various kinds of attribute information. The receiving section 11 checks the contents of received data, and outputs header information to the control section 16, first compressed data to the signal line CDC, second compressed data to the signal line CDI, and third compressed data to the signal line CDS. Switching among the signal lines to which the respective compressed data are to be output is made by the control section 16 by referring to the header information and other information. If received data does not have the predetermined format, control can be made so as to prohibit execution of the following processes. When all code data have been received, the connection to the transmission line is terminated. In this example, the receiving section 11 serves as an input means of the invention because it receives respective compressed data in the above manner.

The expansion section 12a expands first compressed data that has been output to the signal line CDC according to an expansion scheme corresponding to the compression scheme of the first compressed data, and outputs first expanded data to the signal line DDC. The expansion section 12b expands second compressed data that has been output to the signal line CDI according to an expansion scheme corresponding to the compression scheme of the second compressed data, and outputs second expanded data to the signal line DDI. The expansion section 12c expands third compressed data that has been output to the signal line CDS according to an expansion scheme corresponding to the compression scheme of the third compressed data, and outputs third expanded data to the signal line DDS. Each compressed data extracted by the receiving section 11 has been compressed according to a compression scheme that was selected in accordance with its content. Therefore, each of the expansion sections 12a–12c expands compressed data by using the compression scheme corresponding to its compression scheme. The expansion sections 12a–12c pass a resulting raster image to the ensuing processes. Expansion schemes and expansion parameters of the respective expansion sections 12a–12c are set there by the control section 16 through extraction from header information and other information. Each of the expansion sections 12a–12c executes an expansion process according to the expansion scheme and the expansion parameters that have been set by the control section 16.

The image conversion section 13a executes an image conversion process on first expanded data that has been output to the signal line DDC, and outputs first converted image data to the signal line IDC. The image conversion section 13b executes an image conversion process on second expanded data that has been output to the signal line DDI, and outputs second converted image data to the signal line IDI. The image conversion section 13c executes an image conversion process on third expanded data that has been output to the signal line DDS, and outputs third converted image data to the signal line IDS. The contents and processing parameters of image conversion processes to be executed by the respective image conversion sections 13a–13c are set by the control section 16 through extraction from header information and other information. Each of the image conversion sections 13a–13c executes an image conversion process according to its content and processing parameters that have been set by the control section 16.

As an image conversion process, a process for unifying image structures to combine separated image data such as a number-of-gradation-levels conversion, a color space conversion, and a resolution conversion can be performed. Since the number of gradation levels, the color space, and the resolution of received code data have been converted by the transmission side to ones that are most appropriate for each image data, there may occur a case that the code data as received disables a combining process. To avoid such a case, the image conversion sections 13a–13c execute processes suitable for respective expanded data. Therefore, the image conversion sections 13a–13c do not necessarily execute the same process by using the same parameters; they executes image conversion processes independently.

When a composed image is output to an output device, there may occur a case that the image structure such as the resolution, the number of bits (gradation levels) per pixel, the color space of the transmission side are different from those of the output device. In such a case, it is necessary convert each expanded data so that it will be given an image structure that will allow its output by the output device. If necessary, the image conversion sections 13a–13c can execute conversion processes for that purpose such as a resolution conversion, a number-of-gradation-levels conversion, and a color space conversion. Conversion processes for adaptation to the image structure of the output device may be executed by the image conversion section 17.

When a composed image data is output from an output device, different processes can be executed for respective expanded data to comply with the output device. For example, as for a screen process or the like, an image having higher image quality can be output by subjecting respective expanded data to conversion processes in a separated state.

A configuration is possible in which respective expanded data are directly input to the composing section 14 with no processes executed by the image conversion sections 13a–13c or by eliminating the image conversion sections 13a–13c.

The composing section 14 combines first converted image data that is output to the signal line IDC with second converted image data that is output to the signal line IDI in accordance with converted selection data that is output to the signal line IDS, and outputs composed image data to the signal line CPD. Since transmitted code data is such that separated image data have been compressed individually, merely expanding the image data leaves them separated and does not restore the original image. Therefore, it is necessary to execute a combining process in the composing section 14. For example, the combining process can be implemented in such a manner that a pixel of the first converted image data at the same position as the converted selection data is selected if the converted selection data has a pixel value "1," and a pixel of the second converted image data at the same position as the converted selection data is selected if the converted selection data has a pixel value "0." Naturally, the pixel values of the converted selection data may be determined in the opposite way. Or the composing section 14 may execute the combining process in such a manner that the selection between the first piece of and the second piece of image data is performed by considering other data and conditions. The composing section 14 and the image conversion sections 13a–13c constitute an image processing means.

The storage section 15 is a timing adjustment buffer including storage media for temporarily storing data. The storage medium is a medium that allows a read/write device that is part of the hardware resources of a computer to write or read data from itself in a signal format corresponding to the read/write device by causing variation states of magnetic, optical, or electric energy or some other energy in accordance with the data. Among various examples of the storage medium are a magnetic disk, a magneto-optical disc, a CD-R, and a memory that is incorporated in a computer.

The storage section 15 needs to have at least such a storage capacity as to be able to hold first, second, and third compressed data at the same time on a stripe-by-stripe basis. The data input/output timing control [on the storage section 15] is performed by the control section 16.

Figure 2:
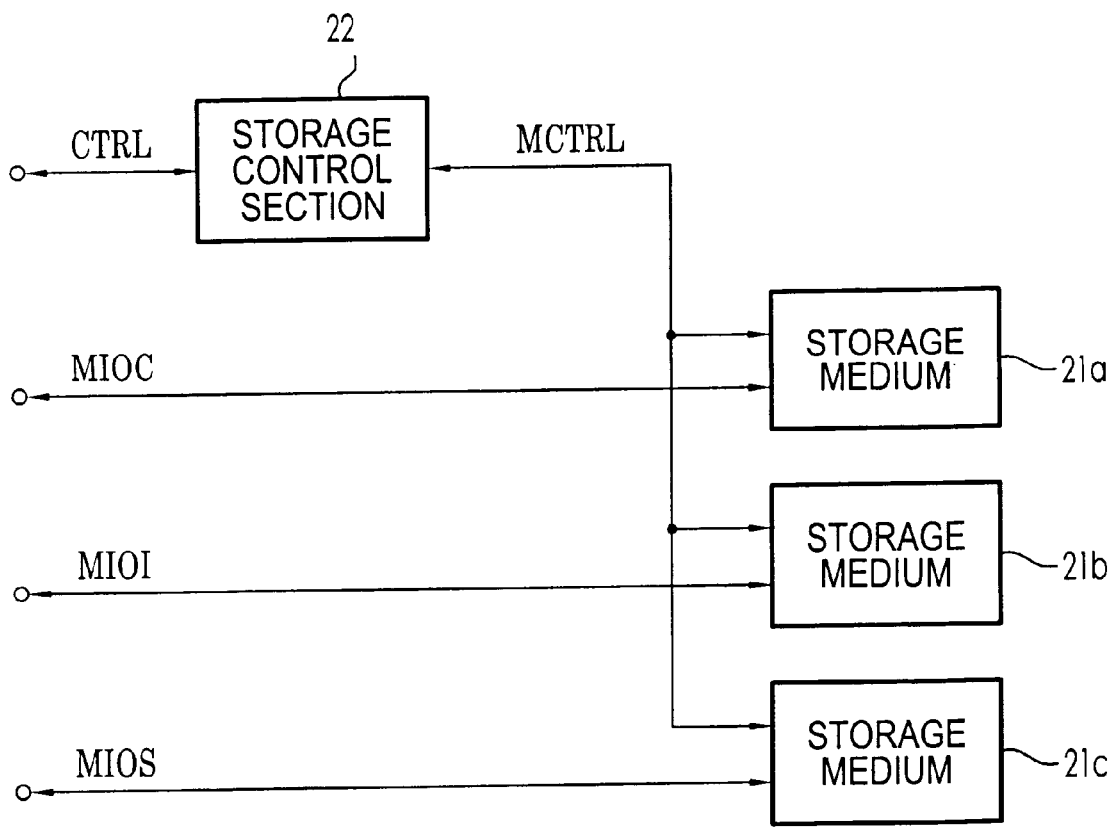
FIG. 2 shows an example configuration of a storage section of the image processing apparatus according to the first embodiment of the invention.

FIG. 2 shows an example configuration of the storage section [15] of the image processing apparatus according to the first embodiment of the invention. In FIG. 2, 21a–21c denote storage media and 22 denotes a storage control section. Signal lines CTRL, MIOC, MIOI, and MIOS are connected to the control section 16 and the signal lines CDC, CDI, and CDS shown in FIG. 1, respectively. A signal to be carried by the signal line CTRL includes at least a signal indicating whether to store data or read out data, an address signal indicating where to store data on the storage media [21a–21c] when the data is to be stored or from where on the storage media [21a–21c] to output data when the data is to be read out, and a signal for controlling the timing of data storage or readout.

When receiving a request from the control section 16 that requests data storage in one of the storage media 21a–21c, the storage control section 22 renders the storage medium concerned in a storable state. When receiving a request from the control section 16 that requests data output from one or more of the storage media 21a–21c, the storage control section 22 renders the medium or media concerned in an output-enabled state. As for the data readout from the storage media 21a–21c, the storage section 15 is so configured that data can be read out simultaneously from at least the storage media 21a and 21b.

Returning to FIG. 1, the control section 16 extracts data that is necessary for restoring a 1-page or 1-stripe image from header information that is input via the receiving section 11, and controls the respective processing sections based on the extracted data. Specifically, the control section 16 performs at least the following controls. First, the control section 16 detects whether a raster image has been restored normally based on the number of pixels in the main scanning direction in one page or one stripe, the number of lines in the auxiliary scanning direction, the number of stripe images in one page (when data is transmitted on a stripe-by-stripe basis), and other information, and executes an error process when it has not been restored normally. For example, if the number of lines in the auxiliary scanning direction of a restored image is smaller than that described in the header information, the control section 16 makes up the deficiency with pixels of a particular color such as white. If the number of lines in the auxiliary scanning direction of an image so far restored has reached that described in the header information, the restoration process is stopped at that time point.

Second, the control section 16 determines whether to execute a number-of-gradation-levels conversion process, a resolution conversion process, a color space conversion process, and other processes in the image conversion processing sections 13a–13c, based on the number of bits per pixel of each separated image data and the resolution and the color space of each separated image. If a conversion process is to be executed, the control section 16 determines processing parameters and sets necessary parameters in the image conversion processing sections 13a–13c. For example, if a resolution conversion process is to be executed, the control section 16 determines resolution conversion ratios so that expanded data will have the same resolution and determines resolution conversion methods for respective expanded data. If a color space conversion process is to be executed, the control section 16 determines and sets conversion parameters. When composed image data is to be output to a particular image output device, the control section 16 can determine whether to execute the respective conversion processes and processing parameters by further taking into account the number of bits per pixel, the resolution, the color space, and other factors of the image output device so as to adapt the conversion process to the image output device. For example, if a resolution conversion process is to be executed, the control section 16 may determine resolution conversion ratios for conversions into the resolution of the image output device and set necessary parameters in the image conversion processing sections 13a–13c. Further, the control section 16 can make settings for execution of a process specific to an image output device such as a screen process.

Third, the control section 16 sets expansion schemes and expansion parameters in the expansion sections 12a–12c based on compression schemes and compression parameters of respective compressed data.

The image conversion section 17 executes an image conversion process on composed image data that is output from the composing section 14, and outputs resulting data. Unlike the above-described image conversion sections 13a–13c, the image conversion section 17 executes, when necessary, a uniform image conversion process on all areas of composed image data. For example, when composed image data is to be output to a particular image output device, the image conversion section 17 can execute an image conversion process suitable for the image output device. The image conversion section 17 need not execute any process if it is not necessary to execute a uniform image conversion process. Or the image conversion section 17 may be eliminated and an output itself of the composing section 14 may be employed as an output of the image processing apparatus of the invention.

The invention as described above may be realized by a combination of hardware units that implement the respective processes or dedicated hardware including an ASIC (application specific integrated circuit) or the like. Alternatively, it may be realized by general-purpose hardware including, for example, a DSP (digital signal processor) or a MPU (microprocessor unit) and control software therefor. The above-described processes do not depend on the method of implementation, and may be implemented by one of the two methods or a combination thereof.

Data that is input to an image processing apparatus of the invention will be described below by using a specific example. FIGS. 3A to 3D illustrate a specific example of data that is input to an image processing apparatus of the invention. For example, assume that original image information is a color image that is a mixture of a pattern and characters as shown in FIG. 3A. In the image shown in FIG. 3A, a map of Japan is drawn in halftone together with characters "JAPAN." The respective characters "JAPAN" are drawn in different colors. For convenience of illustration, different colors are indicated by different manners of hatching and a black portion and a white portion represent black pixels and white pixels, respectively.

For example, the image shown in FIG. 3A is obtained by converting a print description language (hereinafter abbreviated as PDL) into a raster image by decomposing it. Alternatively, it may be such a raster image originally.

The original image shown in FIG. 3A is separated into two image data and selection data that indicates pixels of which of the two image data should be selected by classifying the original image data into a plurality of areas on a pixel-by-pixel basis when a PDL is converted into a raster image or in the state of a raster image. The data separation may be performed by any method. However, in view of the fact that compression is effected at the time of transmission, it is desirable that a text/line figure area including many characters, line figures, etc. and a pattern area such as a photograph where the ratio of edges is smaller than the text/line figure area and includes many portions where the pixel value varies gently be separated from each other.

Figure 3B:
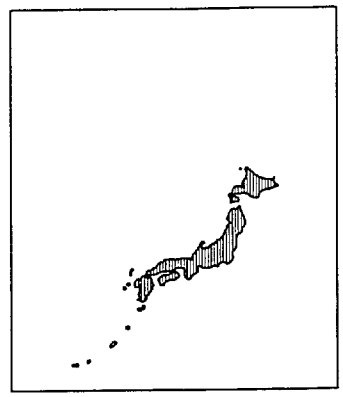
FIGS. 3A to 3D illustrate a specific example of data that is input to an image processing apparatus of the invention.
Figure 3A:
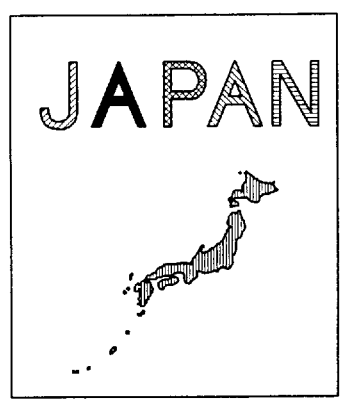
Figure 3C:
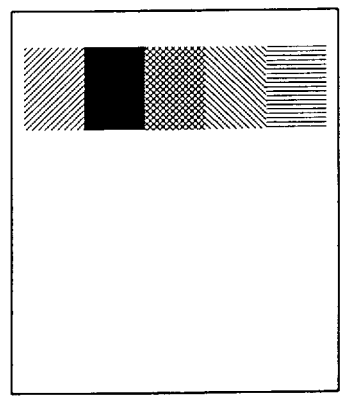
Figure 3D:

FIGS. 3B to 3D show an example in which separation is made between a text/line figure area and a pattern area as described above. In this example, a pattern portion such as a photograph is separated as a first piece of image data. That is, as shown in FIG. 3B, the portion of the map of Japan that is in halftone is separated as a first piece of image data. In the following description, this first piece of image data is called a pattern image. On the other hand, color information of a text/line figure portion is separated as a second piece of image data. That is, as shown in FIG. 3C, only the color information of the characters "JAPAN" is separated as the second piece of image data. In the following description, this second piece of image data is called a text color image. Also in FIGS. 3B and 3C, different colors are indicated by different manners of hatching and a black portion and a white portion represent black pixels and white pixels, respectively.

Selection data is data to be used for making a selection between the first piece of image data (pattern image) and the second piece of image data (text color image). For pixels constituting a character or a line figure, the selection data may be data for selecting the second piece of image data. A set of pixels constituting a character or a line figure is information indicating the shape of the character or the line figure. Therefore, as shown in FIG. 3D, shape information of the characters "JAPAN" is separated on a selection image plane. In FIG. 3D, pixels for selecting the text color image are drawn in black and pixels for selecting the pattern image are drawn in white.

For the pattern image of FIG. 3B, to express a multi-valued color image such as a photograph or a pattern, a data length long enough to represent a color and gradation is needed. For example, the pattern image of FIG. 3B can be constituted of data of 8 bits per pixel and color. On the other hand, the text color image of FIG. 3C needs to be multi-valued color image data that expresses the color of a character on a pixel-by-pixel basis. Therefore, for example, also this text color image can be constituted of data of 8 bits per pixel and color. However, since the text color image need not represent character shapes, for example, characters of uniform colors may be represented by using a color pallette on a character-by-character basis. Therefore, in the example of FIG. 3C, the characters are represented as uniform color regions where the characters exist by using circumscribed rectangles of the characters. Further, since the selection data of FIG. 3D represents the shapes of characters or a line figure, it is desirable that it have a high resolution. However, since the selection data is used only for making a selection between the pattern image and the text color image, in this example the selection data well works if it has information of 1 bit per pixel and hence can be binary data. For example, a pixel of the selection data for selecting a pixel of the pattern image at the same position can have a value "0," and a pixel of the selection data for selecting a pixel of the text color image at the same position can have a value "1." Naturally, the pixel values of the selection data may be determined in the opposite way.

When the above three kinds of image data are recombined into the original image, the original image can be restored by outputting the text color image of FIG. 3C for the portions (black portions) of FIG. 3D representing the shapes of characters or a line figure and outputting the pattern image of FIG. 3B for the other portion (white portion) of FIG. 3D.

Naturally, the separation method is not limited to the above method. For example, the separation may be effected in such a manner that selection data is generated by using circumscribed rectangles or the like of character/line figure portions and the text color image is replaced by image data that is formed by extracting characters or a line figure. Although the above description is directed to the case of a color image, the original image may be an image having only a certain color component or a multi-valued black-and-white image. Further, the number of bits per pixel, that is, the number of gradation levels, is not limited to the above-mentioned value.

Image data that have been obtained by the above-described separation (hereinafter referred to as separated image data) can be compressed individually by selecting compression schemes in accordance with their contents, for example, in such a manner that a text color image, a pattern image, and selection data are compressed according to the Lempel-Ziv scheme, the JPEG scheme, and the MMR scheme, respectively. Since this enables each separated image data to be compressed by the optimum method, both of a character/line figure portion and a pattern portion can be compressed at a high compression ratio while their image quality levels are maintained. Therefore, when those image are transmitted, images of high image quality can be transmitted in a short time. When those image data are stored, they can be stored with a small storage capacity while high image quality levels are maintained.

Respective separated image data may be compressed on a page-by-page basis. Alternatively, respective separated image data may be compressed on a partial image basis in which partial images are obtained by dividing, in the same manner, the respective separated images into N stripe images (N: natural number) in the auxiliary scanning direction, for example, by dividing the respective separated images every 8 lines or at every image boundary. In the following description, it is assumed that respective separated image are divided into stripe images.

Each separated image can be subjected to image processing in accordance with its content before the compression. Examples of image processing are a color space [conversion] process, a number-of-gradation-levels conversion process, etc. (for a text color image and a pattern image) and a resolution conversion process. Naturally, other various kinds of image processing may be performed. For example, as for the resolution conversion process, since a text color image may be of a low resolution as described above, the data amount can further be reduced by converting a text color image into an image of a lower resolution than other image data. Further, a pattern image can be converted into an image of a lower resolution than selection data.

FIGS. 4A to 4C illustrate examples of formats of data that are input to an image processing apparatus of the invention. Separated image data that have been compressed in the above-described manner are gathered into one code data according to a predetermined format. FIG. 4A shows an example format of 1-page code data. In FIG. 4A, PH denotes a page header that describes information necessary to restore a 1-page raster image based on the code data. A repetition of data of respective stripe images follows the page header PH. Each stripe image data is constituted of a stripe header SH and compressed data of selection data, a text color image, and a pattern image. $SH_n$ (n=1, 2, ..., N) denotes a stripe header that describes information necessary to restore the associated stripe image based on the code data. $CODE_{1-n}$ (n=1, 2, ..., N) denotes third compressed data (hereinafter referred to as selection codes) generated by compressing divisional selection data, $CODE_{2-n}$ (n=1, 2, ..., N) denotes second compressed data (hereinafter referred to as text color codes) generated by compressing a divisional text color image, and $CODE_{3-n}$ (n=1, 2, ..., N) denotes first compressed data (hereinafter referred to as pattern codes) generated by compressing a divisional pattern image. EOP denotes a code indicating the end of the page.

FIG. 4B shows an example format of the page header PH. In the format shown in FIG. 4B, DSC is a code indicating the fact that the ensuing data comply with this format, SOP denotes a code indicating the beginning of the page, FLPH denotes information indicating the length of the page header itself, and $PDAT_1$–$PDAT_i$ (i: natural number) denote page information. For example, the page information includes the number of pixels in the main scanning direction, the number of lines in the auxiliary scanning direction, the color space, the number of bits per pixel of each separated image data, the resolution of each separated image data, the compression scheme and the compression parameters of each separated image data, the order of compressed codes of respective separated image data in the code data, and the number of stripe images.

FIG. 4C shows an example format of the stripe header SH. In the format shown in FIG. 4C, SOS denotes a code indicating the beginning of the stripe, FLPH denotes information indicating the length of the page header itself, and $SDAT_1$–$SDAT_j$ (j: natural number) denote stripe information. For example, the stripe information includes the number of lines of the stripe image in the auxiliary scanning direction and the lengths of respective compressed codes.

Where an image is not divided in the auxiliary scanning direction, data that have been generated by compressing selection data, a text color image and arranged in predetermined order, and a pattern image of the entire page follow a page header PH. Where images of a plurality of pages are transmitted as one document, data of the document may be generated in such a manner that information indicating all the contents of the document is added to the head, information indicating the end of the document is added to the tail, and code data of the number of pages of the document are inserted between those two kinds of information (the code data format of one page is shown in FIG. 4A).

FIGS. 5A to 5D illustrate modifications of formats of data that are input to an image processing apparatus of the invention. When, for example, a color image is transmitted or stored, it is necessary to format data for each color. For example, in the case of data in the RGB color space, each of a text color image and a pattern image has data of the respective colors R, G, and B for each pixel. There are several methods of formatting data of the respective colors. For example, FIG. 5A shows a method in which data of the three colors are provided in each of a text color code $CODE_{2-n}$ (n=1, 2, . . . , N) and a pattern code $CODE_{3-n}$ (n=1, 2, . . . , N). FIG. 5B shows a method in which text color codes and pattern codes are provided for the respective colors. FIG. 5C shows a method in which a series of a stripe header SH and code data of each color is arranged repeatedly. FIG. 5D shows a method in which 1-page code data of each color is generated in the manner shown in FIG. 4A. In this case, since selection codes are common to the three colors, they may be included in data of a color component that will be sent first.

Naturally, the above-described formats are just examples, and other formats may be used as long as they allow compressed separated image data to be multiplexed into code data and includes information necessary to restore 1-page image based on the code data. Further, the color space shown in FIG. 5 is just an example and any color space may be used. The following description is directed to an example in which data according to the format of FIG. 4 is input.

Code data generated by the above operations is transmitted via a network such as the Internet or a LAN or a public line. Alternatively, code data is registered or stored in an image filing apparatus or a database.

The image processing apparatus according to the first embodiment restores a 1-page raster image based on transmitted code data with an assumption that code data that is formatted in the above-described manner is transmitted. The restoration process requires at least a receiving process for receiving code data from a network or a public line, extracts information from the code data, and outputs the extracted information to the ensuing processes, an expansion process for expanding compressed codes that have been generated by compressing respective separated images, and a composing process for combining separated images into one raster image. Further, there may occur a case that an image conversion process such as a color conversion and a resolution conversion is needed to equalize the image structures of respective separated image data at the time of composing or to reproduce an image that is more faithful to the original image. Therefore, because of input/output relationships between the respective processes, the processes should be executed in order of receiving process →expansion process →(image conversion process →) composing process (→image conversion process). The image conversion process that is executed before the composing process is done on each separated image data, and hence can be made suitable for each separated image. The image conversion process that is executed after the composing process is done on a composed 1-plane raster image, and hence not only the amount of hardware necessary for the conversion process but also the apparatus cost can be reduced. The image conversion process may be executed either before or after the composing process, or both before and after the composing process depending on the property of the process.

Incidentally, since transmitted code data complies with a predetermined format as shown in FIG. 4, separated images are processed sequentially on a page-by-page basis or a stripe-by-stripe basis. For example, when the format of FIG. 4 is used, selection codes, text color codes, and pattern codes are transmitted in this order on a page-by-page basis or a stripe-by-stripe basis. However, three image data of corresponding pixels need to be input at the same time when the composing section 14 executes a composing process. To this end, separated image data should be synchronized with each other sometime between reception of code data and execution of the composing process. In the first embodiment being described, compressed data are temporarily stored in the storage section 15 immediately after reception of code data, and an expansion process is executed by reading out those compressed data [from the storage section 15] in a synchronized manner. This configuration has an advantage that the capacity of the storage section 15 for synchronization is minimized.

Figure 6:
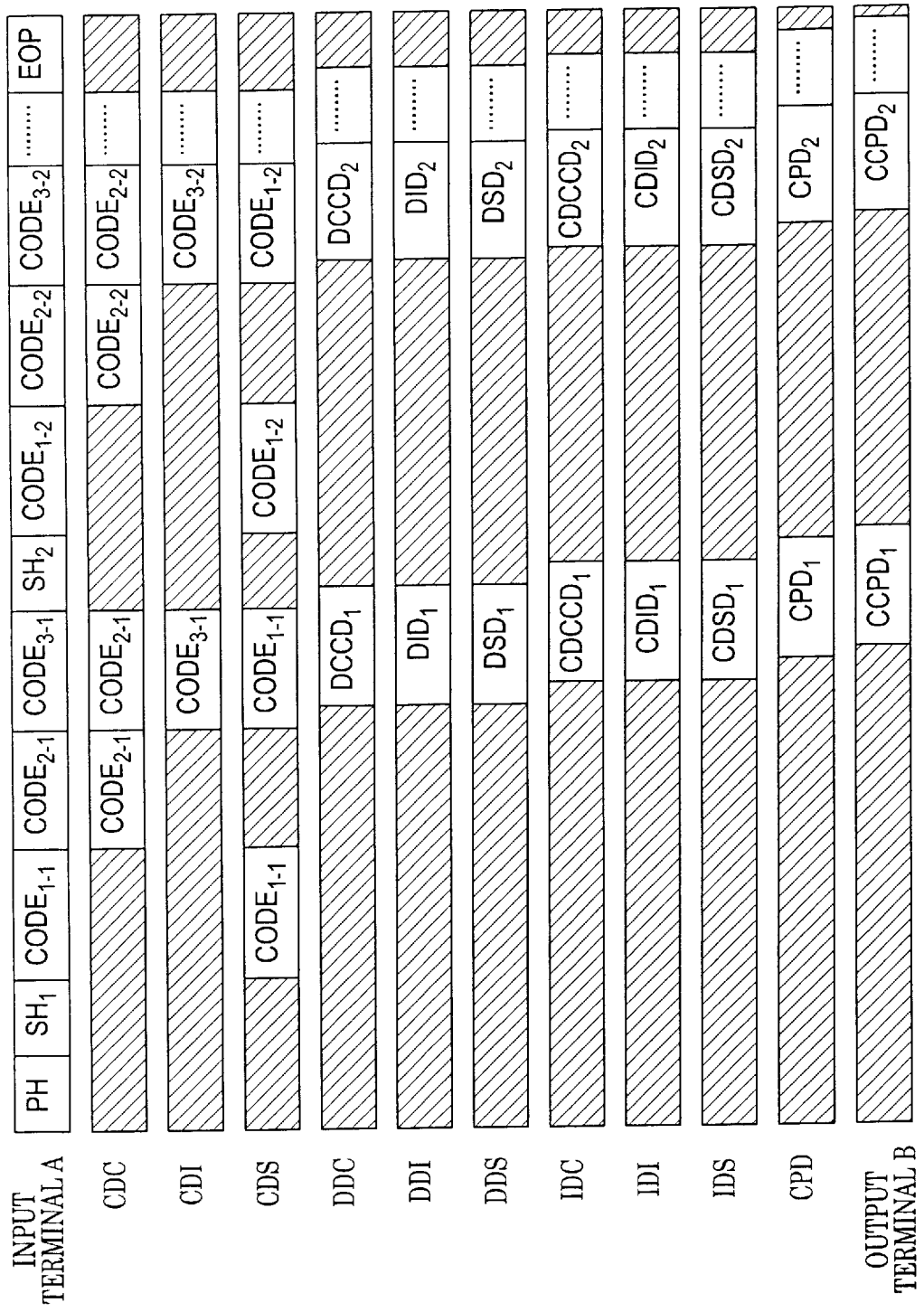
FIG. 6 is a timing chart for description of an example operation of the image processing apparatus according to the first embodiment of the invention.

FIG. 6 is a timing chart for description of an example operation of the image processing apparatus according to the first embodiment of the invention. How synchronization is taken among separated image data by using the storage section 15 as described above will be described with reference to the timing chart of FIG. 6. In FIG. 6, $DCCD_n$ denotes first expanded data of an nth stripe image, $DID_n$ denotes second expanded data of the nth stripe image, and $DSD_n$ denotes third expanded data of the nth stripe image. $CDCCD_n$ denotes first converted image data of the nth stripe image, $CDID_n$ denotes second converted image data of the nth stripe image, and $CDSD_n$ denotes third converted selection data. $CPD_n$ denotes composed image data of the nth stripe image, and $CCPD_n$ denotes an output image of the nth stripe image. Hatched portions indicate invalid data periods.

Code data according to the format of FIG. 4 are sequentially input to the input terminal A. First, the receiving section 11 receives a page header PH. Then, the receiving section 11 checks whether the code data being received complies with the format of FIG. 4 by detecting whether a code DSC exists at, for example, the head of the page header PH. Then, the receiving section 11 passes the page header PH to the control section 16. The receiving section 11 passes, to the control section 16, also a stripe header $SH_1$ of the first stripe image that is input next. The extraction of the page header PH and a stripe header $SH_n$ is controlled by the control section 16 based on data that are extracted from the page header PH and the stripe header $SH_n$ and indicate their lengths. If a code DSC does not exist at the head of the code data being received, the ensuing data are not output.

Selection codes $CODE_{1-1}$ of the first stripe image is input after the stripe header $SH_1$ and output to the signal line CDS. The selection codes $CODE_{1-1}$ are stored in the storage section 15. Text color codes $CODE_{2-1}$ that are input next are output to the signal line CDC and also stored in the storage section 15. Pattern codes $CODE_{3-1}$ are output to the signal line CDI. The pattern codes $CODE_{3-1}$ are stored in the storage section 15 and, at the same time, input to the expansion section 12b. At this time point, the selection codes $CODE_{1-1}$ and the text color codes $CODE_{2-1}$ are read out from the storage section 15 and input to the expansion sections 12c and 12a, respectively. The respective compressed data are input to the expansion sections 12a–12c so that pixels at the same position are output at the same time from the image conversion sections 13a–13c. Specifically, the control section 16 controls the timing of reading out the respective compressed codes from the storage section 15 in accordance with the output data amounts of the image conversion sections 13a–13c.

The switching among the selection codes, the text color codes, and the pattern codes in the receiving section 11 is controlled by the control section 16 based on data in the page header PH and the stripe header $SH_n$ indicating the order and the lengths of the compressed codes of the respective separated images in the code data.

The expansion sections 12a–12c are controlled by the control section 16 in accordance with compression schemes and compression parameters of the respective compressed codes that are extracted from the page header PH and the stripe header $SH_n$. The expansion sections 12a–12c execute respective expansion processes according to the expansion schemes and the expansion parameters thus set. As a result, the text color codes $CODE_{2-1}$ the pattern codes $CODE_{3-1}$ and the selection codes $CODE_{1-1}$ that have been input to the respective expansion sections 12a–12c are expanded according to expansion algorithms corresponding to the compression algorithms that were used at the time of their compression, and expanded data are input to the image conversion sections 13a–13c.

The expanded data that have been input to the respective image conversion sections 13a–13c are subjected to the respective image conversion processes and then input to the composing section 14. Processing contents and processing parameters of the respective image conversion sections 13a–13c are set there by the control section 16 in accordance with the numbers of bits (i.e., the numbers of gradation levels) per pixel of the respective separated image data represented by the code data, and the resolutions and the color spaces of the respective separated image data that are extracted from the page header PH and the stripe header $SH_n$, and even the number of bits (i.e., the number of gradation levels) per pixel, the resolution, and the color space of an output destination device of a restored image. The image conversion sections 13a–13c execute respective image conversion processes according to the processing contents and the processing parameters thus set.

As seen from the timing relationships among the signals on the signal lines DDC, DDI, DDS, IDC, IDI, and IDS shown in FIG. 6, the expansion processes and the image conversion processes for the respective separated image data are executed approximately in parallel.

First to third converted image data that are output from the image conversion sections 13a–13c to the output lines IDC, IDI, and IDS are in pixel-based synchronization with each other. The first and second converted image data are combined with each other in the composing section 14 based on the third converted image data (selection data).

Composed image data that has been composed by the composing section 14 and output to the signal line CPD is subjected, if necessary, to an image conversion process suitable for an output device in the image conversion section 17, and resulting data is output from the output terminal B as a first stripe image.

Thereafter, the above-described processes excluding the process relating to the page header PH are executed in similar manners on all of the second and subsequent stripe images. The 1-page restoration process is finished upon detection of a page end code EOP.

According to the above processes, a raster image of one page can be restored correctly based on code data that are sequentially transmitted according to, for example, the format of FIG. 4. Where a composed image is output to an output device, an image conversion process suitable for the output device is executed, which allows a printout operation of a printer or a display operation of a display device to be performed without causing any problem.

Figure 7:
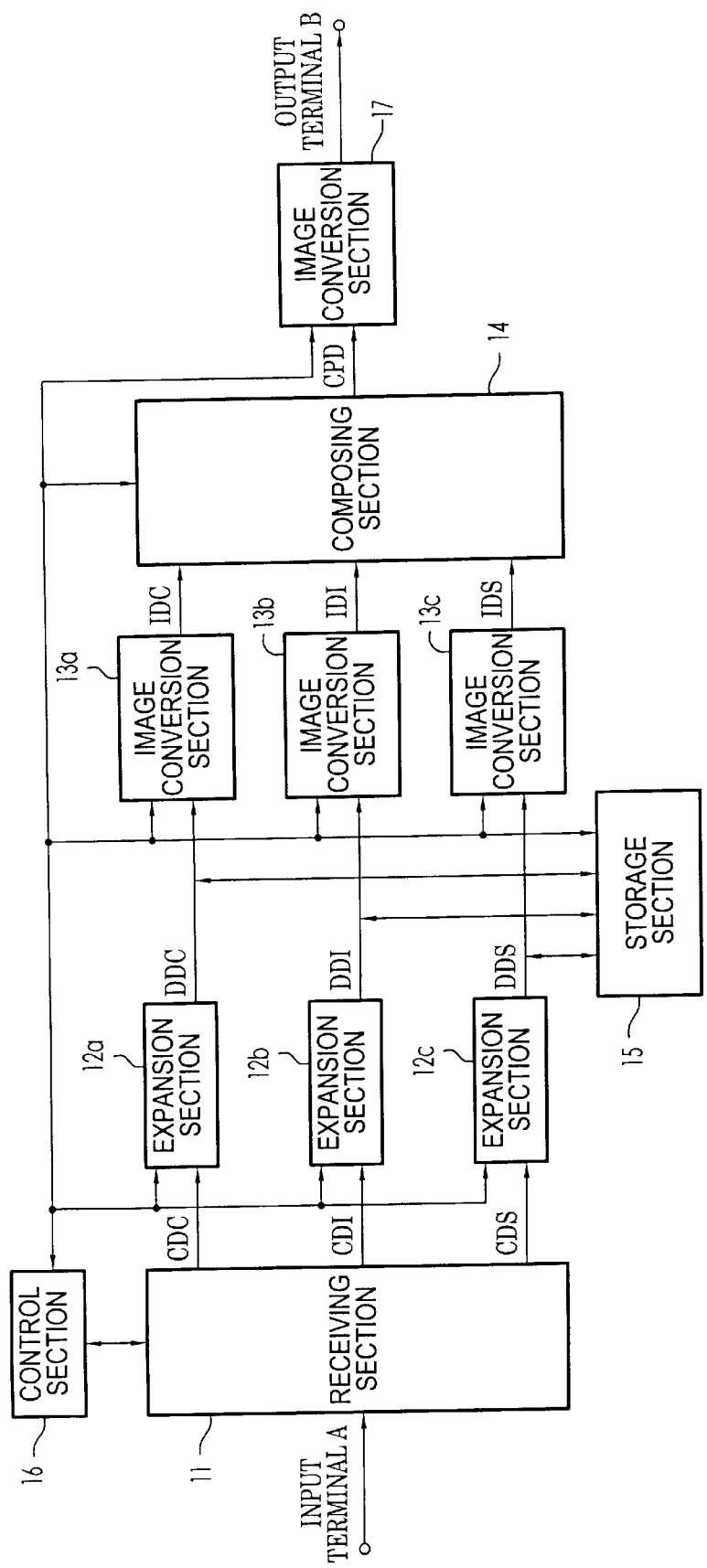
FIG. 7 shows a general configuration of an image processing apparatus according to a second embodiment of the invention.

FIG. 7 shows a general configuration of an image processing apparatus according to a second embodiment of the invention. FIG. 7 uses the same reference symbols as FIG. 1, and the components that are the same as in the first embodiment will not be described. The second embodiment is different from the first embodiment in the connections of the storage section 15, that is, in the time point when separated image data are synchronized with each other. In the second embodiment, the storage section 15 is connected to the signal lines DDC, DDI, and DDS. That is, in FIG. 7, the signal line CDC connects the receiving section 11 and the expansion section 12a, the signal line CDI connects the receiving section 11 and the expansion section 12b, and the signal line CDS connects the receiving section 11 and the expansion section 12c. The signal line DDC is for connection between the expansion section 12a, the storage section 15, and the image conversion section 13a. The signal line DDI is for connection between the expansion section 12b, the storage section 15, and the image conversion section 13b. The signal line DDS is for connection between the expansion section 12c, the storage section 15, and the image conversion section 13c.

In the above configuration in which expanded data are stored in the storage section 15, it is not necessary to consider the processing timing among the expansion sections 12a–12c whose processing times are difficult to determine. This provides an advantage that the timing can be taken relatively easily. Further, if separated image data that have been subjected to resolution conversions are included, the data amounts are relatively small and hence the capacity [of the storage section 15] can be relatively small.

Figure 8:
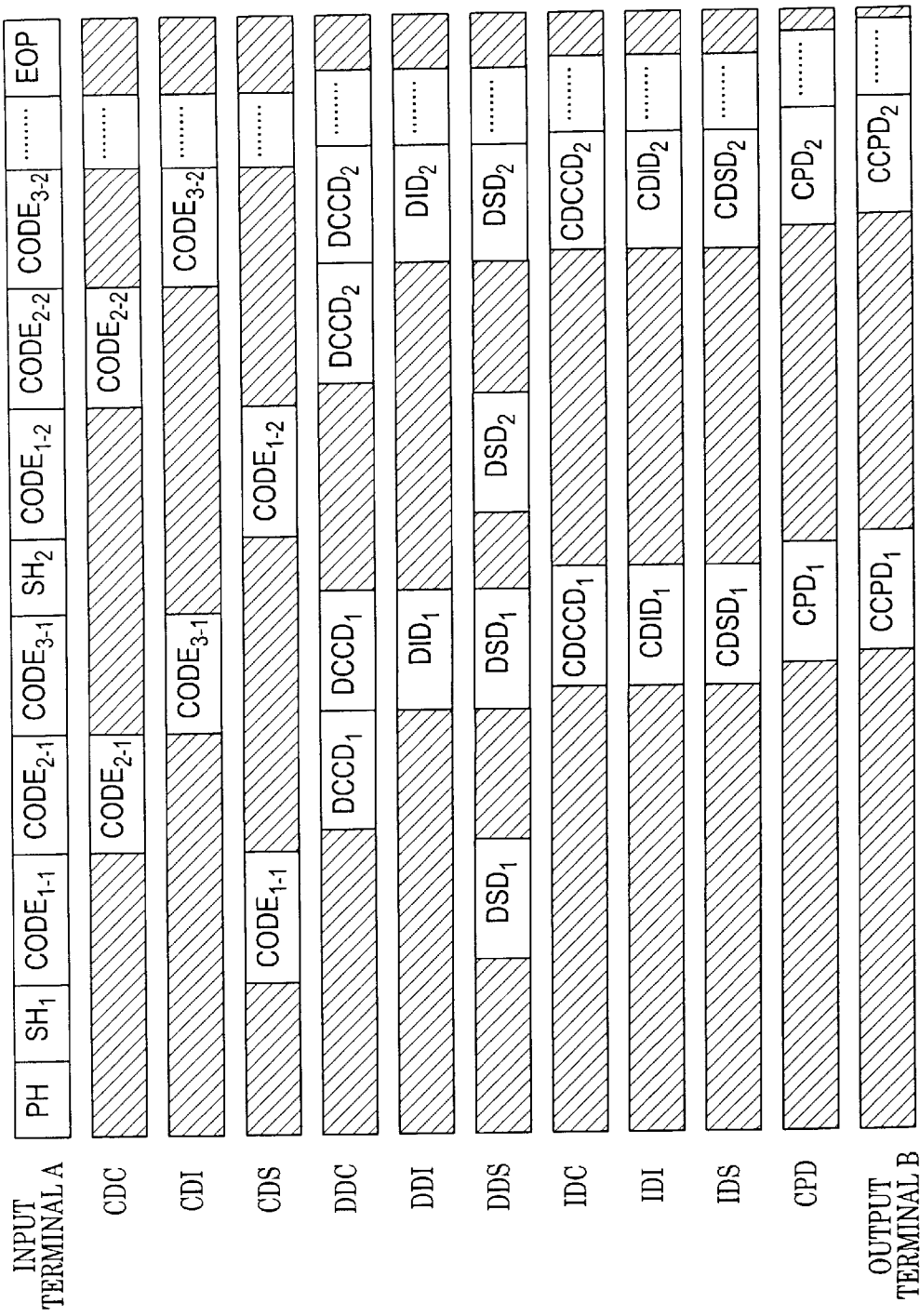
FIG. 8 is a timing chart for description of an example operation of the image processing apparatus according to the second embodiment of the invention.

FIG. 8 is a timing chart for description of an example operation of the image processing apparatus according to the second embodiment of the invention. How synchronization is taken among separated image data by using the storage section 15 in the second embodiment will be described with reference to the timing chart of FIG. 8. The signal names etc. shown in FIG. 8 are the same as in FIG. 6.

Code data according to the format of FIG. 4 are sequentially input to the input terminal A. First, the receiving section 11 receives a page header PH. Then, the receiving section 11 checks whether the code data being received complies with the format of FIG. 4 by detecting whether a code DSC exists at, for example, the head of the page header PH. Then, the receiving section 11 passes the page header PH to the control section 16. The receiving section 11 passes, to the control section 16, also a stripe header $SH_1$ of the first stripe image that is input next.

Selection codes $CODE_{1-1}$ of the first strips image that are input next to the stripe header $SH_1$ are input to the expansion section 12c. Text color codes $CODE_{2-1}$ that are input next are input to the expansion section 12a. Further, pattern codes $CODE_{3-1}$ are input to the expansion section 12b. The expansion sections 12a–12c expand the received text color codes $CODE_{2-1}$, pattern codes $CODE_{3-1}$, and selection codes $CODE_{1-1}$, respectively, according to expansion algorithms corresponding to the compression algorithms that were used at the time of their compression, and sequentially output expanded data. Third expanded data, first expanded data, and second expanded data that are output in this order are sequentially stored in the storage section 15.

The second expanded data is input to the image conversion section 13b at the same as stored in the storage section 15. At this time, the first expanded data and the third expanded data are read out from the storage section 15 and input to the image conversion sections 13a and 13c, respectively. The respective expanded data are input to the image conversion sections 13a–13c so that pixels at the same position are output at the same time from the image conversion sections 13a–13c. Specifically, the control section 16 controls the timing of reading out the respective expanded data from the storage section 15 in accordance with the output data amounts of the image conversion sections 13a–13c.

The expanded data that have been input to the image conversion sections 13a–13c are subjected to respective image conversion processes. As seen from the timing relationships among the signals on the signal lines IDC, IDI, and IDS shown in FIG. 8, the image conversion processes for the respective separated image data are executed approximately in parallel.

First converted image data, second converted image data, and converted selection data that are output from the image conversion sections 13a–13c are input to the composing section 14 as data that are timed with each other on a pixel-by-pixel basis. The first and second converted image data are combined with each other in the composing section 14 based on the third converted image data (selection data).

Composed image data that has been composed by the composing section 14 and output to the signal line CPD is subjected, if necessary, to an image conversion process suitable for an output device in the image conversion section 17, and resulting data is output from the output terminal B as a first stripe image. In the above processes, the control section 16 performs the same control operations as in the first embodiment.

Thereafter, the above-described processes excluding the input of the page header [PH] are executed in similar manners on all of the second and subsequent stripe images. The 1-page restoration process is finished upon detection of a page end code EOP.

According to the above processes, a raster image of one page can be restored correctly based on code data that are sequentially transmitted according to, for example, the format of FIG. 4. Where a composed image is output to an output device, an image conversion process suitable for the output device is executed, which allows, for example, a printout operation of a printer or a display operation of a display device to be performed without causing any problem.

Figure 9:
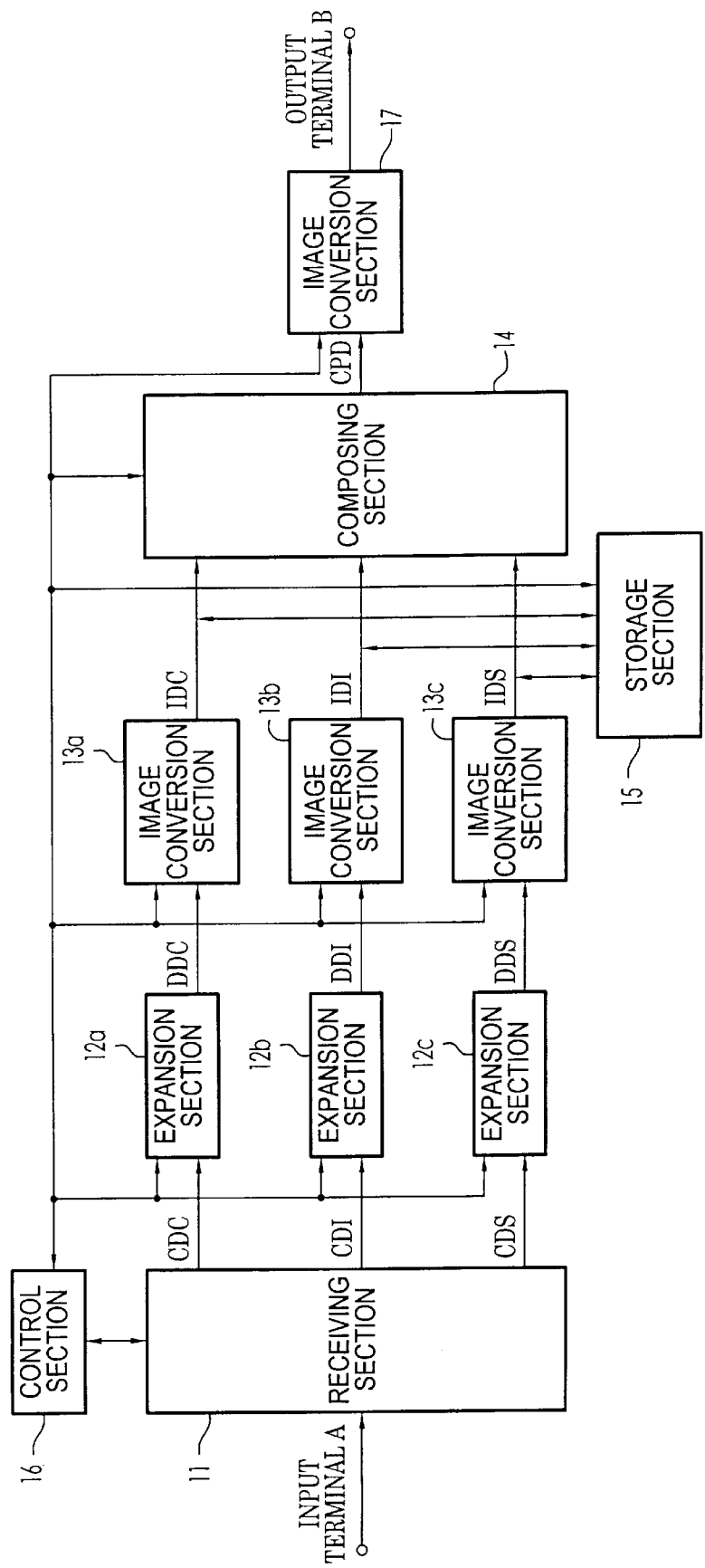
FIG. 9 shows a general configuration of an image processing apparatus according to a third embodiment of the invention.

FIG. 9 shows a general configuration of an image processing apparatus according to a third embodiment of the invention. FIG. 9 uses the same reference symbols as FIG. 1, and the components that are the same as in the first embodiment will not be described. The third embodiment is different from the first embodiment in the connections of the storage section 15, that is, in the time point when separated image data are synchronized with each other. In the third embodiment, the storage section 15 is connected to the signal lines IDC, IDI, and IDS. That is, in FIG. 9, the signal line CDC connects the receiving section 11 and the expansion section 12a, the signal line CDI connects the receiving section 11 and the expansion section 12b, and the signal line CDS connects the receiving section 11 and the expansion section 12c. The signal line IDC is for connection between the image conversion section 13a, the storage section 15, and the composing section 14. The signal line IDI is for connection between the image conversion section 13b, the storage section 15, and the composing section 14. The signal line IDS is for connection between the image conversion section 13c, the storage section 15, and the composing section 14.

In the above configuration in which first converted image data, second converted image data, and converted selection data are stored in the storage section 15, timing can be taken immediately before execution of a composing process. Therefore, the timing of the composing process can be taken most easily without depending on processing times in the expansion sections 12a–12c and the image conversion sections 13a–13c. A configuration that is obtained in the third embodiment when the image conversion sections 13a–13c are rendered unfunctional or not incorporated is substantially the same as a configuration that is obtained in the second embodiment when the image conversion sections 13a–13c are rendered unfunctional or not incorporated.

Figure 10:
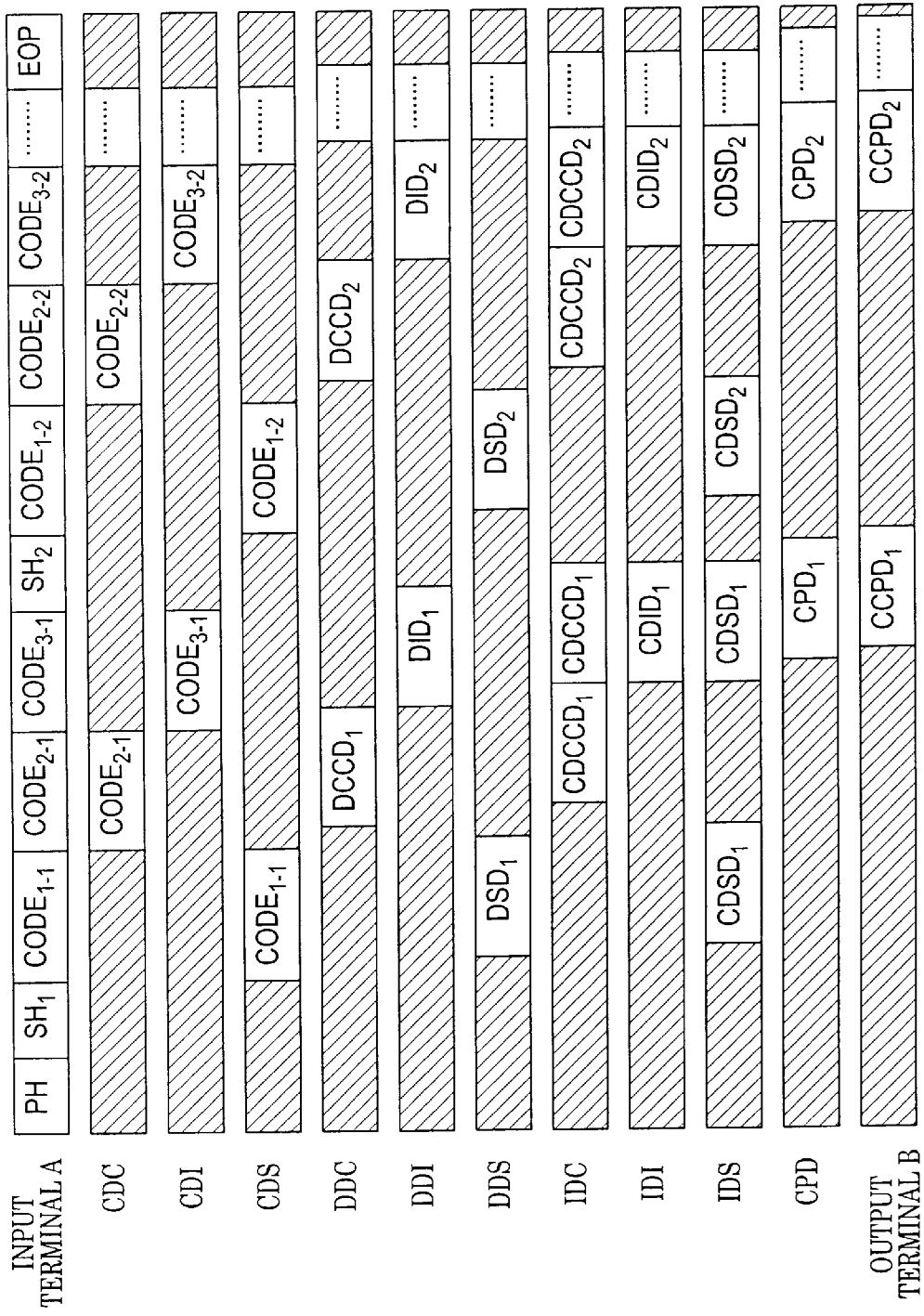
FIG. 10 is a timing chart for description of an example operation of the image processing apparatus according to the third embodiment of the invention.

FIG. 10 is a timing chart for description of an example operation of the image processing apparatus according to the third embodiment of the invention. How synchronization is taken among separated image data by using the storage section 15 in the third embodiment will be described with reference to the timing chart of FIG. 10. The signal names etc. shown in FIG. 10 are the same as in FIG. 6.

Code data according to the format of FIG. 4 are sequentially input to the input terminal A. First, the receiving section 11 receives a page header PH. Then, the receiving section 11 checks whether the code data being received complies with the format of FIG. 4 by detecting whether a code DSC exists at, for example, the head of the page header PH. Then, the receiving section 11 passes the page header PH to the control section 16. The receiving section 11 passes, to the control section 16, also a stripe header $SH_1$ of the first stripe image that is input next.

Selection codes $CODE_{1-1}$, text color codes $CODE_{2-1}$, pattern codes $CODE_{3-1}$ of the first strips image that are input next to the stripe header $SH_1$ are input to the expansion sections 12c, 12a, and 12b, respectively. The expansion sections 12a–12c expand the received text color codes $CODE_{2-1}$, pattern codes $CODE_{3-1}$, and selection codes $CODE_{1-1}$, respectively, according to expansion algorithms corresponding to the compression algorithms that were used at the time of their compression, and sequentially output expanded data. Third expanded data, first expanded data, and second expanded data that are output in this order are sequentially input to the image conversion sections 13c, 13a, and 13b, respectively.

The expanded data that have been input to the image conversion sections 13a–13c are subjected to respective image conversion processes there, and then sequentially stored in the storage section 15. Second converted image data is not only stored in the storage section 15 but also input to the composing section 14. At this time, converted selection data and first converted image data are read out from the storage section 15 and input to the composing section 14. The timing of reading out the first converted image data, the second converted image data, and the converted selection data from the storage section 15 is controlled by the control section 16 so that pixels at the same position are input at the same time to the composing section 14. When combined in the composing section 14, the first converted image data, the second converted image data, and the converted selection data are input to the composing section 14 as data that are timed with each other on a pixel-by-pixel basis.

The first and second converted image data that have been input to the composing section 14 are combined with each other there based on the converted selection data.

Composed image data that has been composed by the composing section 14 and output to the signal line CPD is subjected, if necessary, to an image conversion process suitable for an output device in the image conversion section 17, and resulting data is output from the output terminal B as a first stripe image. In the above processes, the control section 16 performs the same control operations as in the first embodiment.

Thereafter, the above-described processes excluding the input of the page header [PH] are executed in similar manners on all of the second and subsequent stripe images. The 1-page restoration process is finished upon detection of a page end code EOP.

According to the above processes, a raster image of one page can be restored correctly based on code data that are sequentially transmitted according to, for example, the format of FIG. 4. Where a composed image is output to an output device, an image conversion process suitable for the output device is executed, which allows, for example, a printout operation of a printer or a display operation of a display device to be performed without causing any problem.

Figure 11:
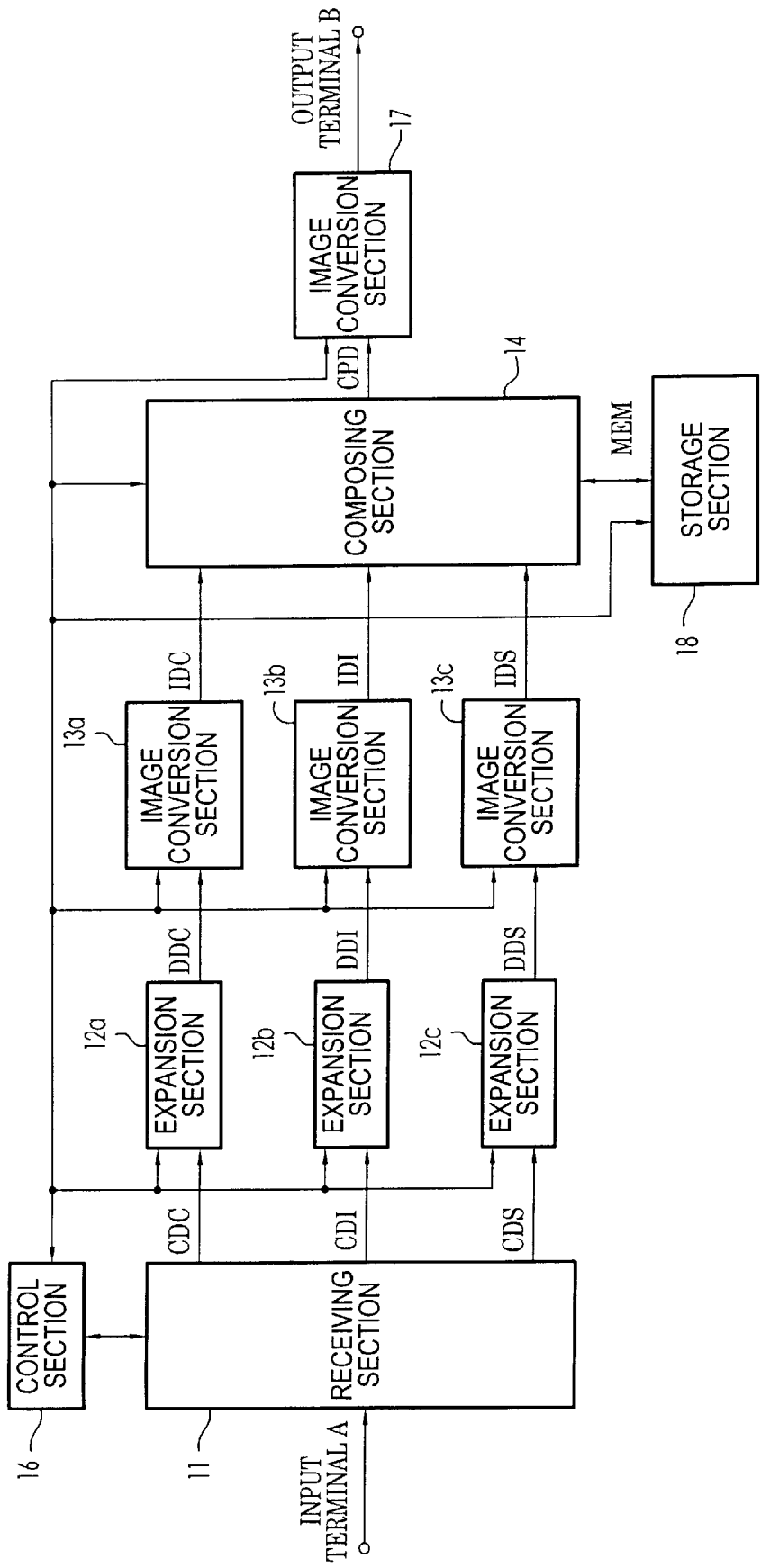
FIG. 11 shows a general configuration of an image processing apparatus according to a fourth embodiment of the invention.

FIG. 11 shows a general configuration of an image processing apparatus according to a fourth embodiment of the invention. The components in FIG. 11 that are the same as in FIG. 1 are given the same reference symbols as in FIG. 1, and descriptions therefor will be omitted. 18 denotes a storage section. The fourth embodiment is different from the first embodiment in the connections and the configuration of the storage section 15. The fourth embodiment is directed to a case where the storage section 15 is connected to the composing section 14 and a composing process of the composing section 14 is executed by using the storage section 15. In FIG. 11, the signal line CDC connects the receiving section 11 and the expansion section 12a, the signal line CDI connects the receiving section 11 and the expansion section 12b, and the signal line CDS connects the receiving section 11 and the expansion section 12c. A signal line MEM connects the composing section 14 and the storage section 18.

Figure 12A:
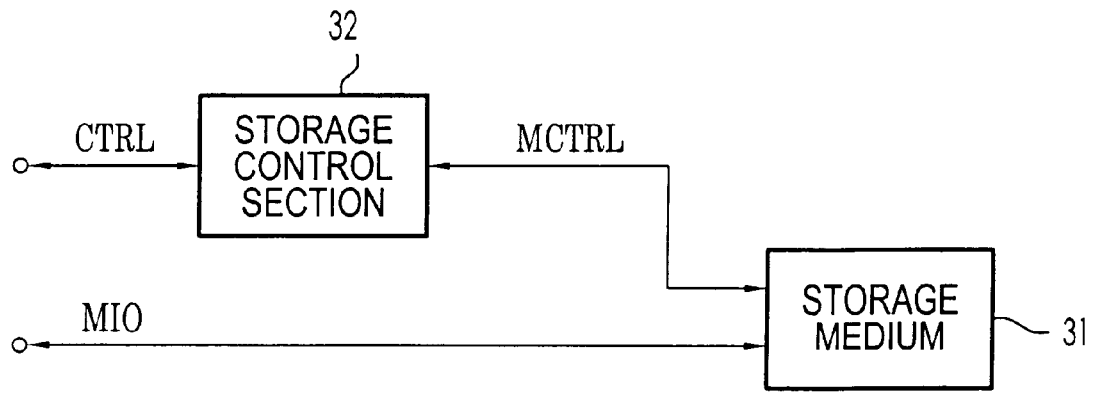
FIGS. 12A and 12B show an example configuration of a storage section of the image processing apparatus according to the fourth embodiment of the invention.
Figure 12B:
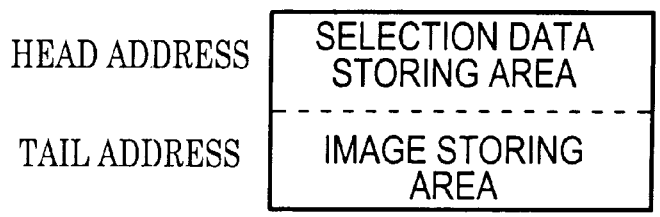

The storage section 18 is used when an image is composed in the composing section 14. FIGS. 12A and 12B show an example configuration of the storage section [18] of the image processing apparatus according to the fourth embodiment of the invention. In FIGS. 12A and 12B, 31 and 32 denote a storage medium and a storage control section 32, respectively, and signal lines CTRL and MIO are connected to the control section 16 and the signal line MEM, respectively. A signal that is carried by the signal line CTRL includes at least a signal indicating whether to store or output data, an address signal indicating where to store data on the storage medium 31 when the data is to be stored or from where on the storage medium 31 to output data when the data is to be output, and a signal for controlling the timing of data storage or data output.

The storage medium 31 can be of the same type as the storage media used in the above-described storage section 15. The storage control section 32 renders the storage medium 31 in a storable state when receiving a storage request from the control section 16, and renders the storage medium 31 in an output-enabled state when receiving a data output request from the control section 16. It is assumed that a control is so made that, for example, a data storage area of the storage medium 31 is divided into a selection data storing area for storing selection data and an image storing area for storing a first piece of and a second piece of image data as shown in FIG. 12B. In this configuration, it is sufficient that the image storing area have such a capacity as to be able to one of the first piece of and the second piece of image data and hence the capacity of the image storing area can be made smaller than that of the storage section of the third embodiment.

Figure 13:
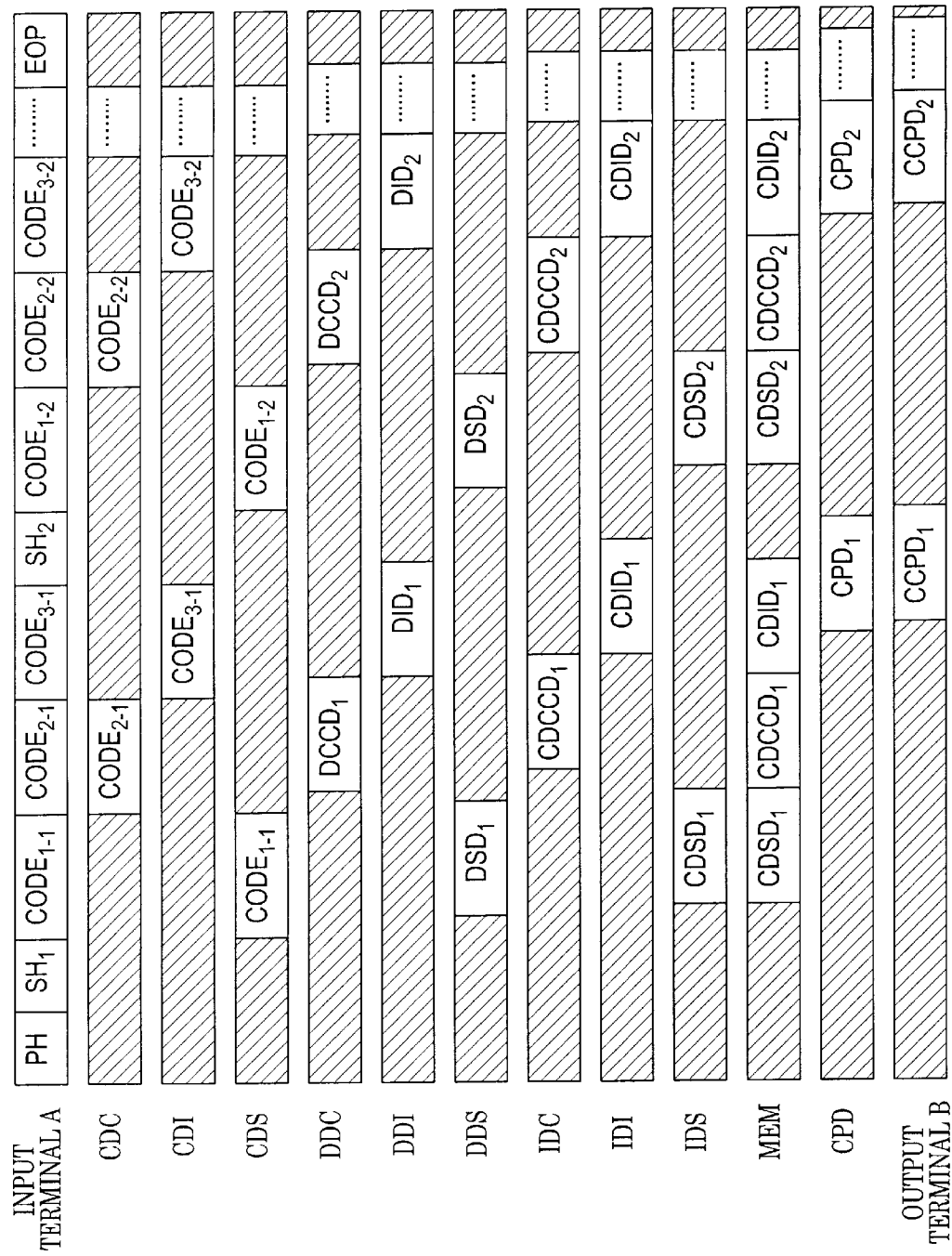
FIG. 13 is a timing chart for description of an example operation of the image processing apparatus according to the fourth embodiment of the invention.

FIG. 13 is a timing chart for description of an example operation of the image processing apparatus according to the fourth embodiment of the invention. The signal names etc. shown in FIG. 13 are the same as in FIG. 6. Code data according to the format of FIG. 4 are sequentially input to the input terminal A. First, the receiving section 11 receives a page header PH. Then, the receiving section 11 checks whether the code data being received complies with the format of FIG. 4 by detecting whether a code DSC exists at, for example, the head of the page header PH. Then, the receiving section 11 passes the page header PH to the control section 16. The receiving section 11 passes, to the control section 16, also a stripe header $SH_1$ of the first stripe image that is input next.

Selection codes $CODE_{1-1}$, text color codes $CODE_{2-1}$, pattern codes $CODE_{3-1}$ of the first strips image that are input next to the stripe header $SH_1$ are input to the expansion sections 12c, 12a, and 12b, respectively. The expansion sections 12a–12c expand the received text color codes $CODE_{2-1}$, pattern codes $CODE_{3-1}$, and selection codes $CODE_{1-1}$, respectively, according to expansion algorithms corresponding to the compression algorithms that were used at the time of their compression, and sequentially output expanded data. Third expanded data, first expanded data, and second expanded data that are output in this order are sequentially input to the image conversion sections 13c, 13a, and 13b, respectively. The expanded data that have been input to the image conversion sections 13a–13c are subjected to respective image conversion processes there, and then output to the composing section 14.

The converted selection data and the first converted image data that have been input to the composing section 14 are stored in the storage section 18 as they are. When the second converted image data has been input to the composing section 14, the composing section 14 reads out the previously stored converted selection data from the storage section 18 in such a manner that their pixels are correlated with the pixels of the input second converted image data. Only when the read-out converted selection data is data for selecting the second piece of image data, the pixel of the input second converted image data is caused to overwrite the pixel at the same position of the first converted image data being stored in the storage section 18. In this manner, the first piece of image data or the second piece of image data is stored in the storage section 18 selectively on a pixel-by-pixel basis.

The first converted image data stored in the storage section 18 is subjected to a judgment of whether to be overwritten by each pixel of the second converted image data. Overwritten pixels are output to the composing section 14 in order of overwriting operations. The composing section 14 outputs, as composed image data, data that are output from the storage section 15. FIG. 13 does not show the timing of readout of composed image data to the signal line MEM. In this example, this is done so as to be timed with writing of second image data $CDID_1$. Naturally, the readout of combined image data may be started after the writing of the second piece of image data has been completed.

Composed image data that has been composed by the composing section 14 and output to the signal line CPD is subjected, if necessary, to an image conversion process suitable for an output device in the image conversion section 17, and resulting data is output from the output terminal B as a first stripe image. In the above processes, the control section 16 performs the same control operations as in the first embodiment.

Thereafter, the above-described processes excluding the input of the page header [PH] are executed in similar manners on all of the second and subsequent stripe images. The 1-page restoration process is finished upon detection of a page end code EOP.

According to the above processes, a raster image of one page can be restored by correctly combining code data that are sequentially transmitted according to, for example, the format of FIG. 4 and are not timed with each other. Where a composed image is output to an output device, an image conversion process suitable for the output device is executed, which allows, for example, a printout operation of a printer or a display operation of a display device to be performed without causing any problem.

The image processing apparatuses according to several embodiments of the invention have been described above. However, the invention is not limited to those embodiments. For example, although the above embodiments assume that a 1-page image is processed on a stripe-by-stripe basis in which the stripes are generated by dividing the 1-page image in the auxiliary scanning direction, page-by-page processing in which no division into stripes is made is also possible. This may be done in such a manner that the storage capacity of the storage section 15 is so set as to enable at least page-based, simultaneous storage of a first piece of image data, a second piece of image data, and selection data or the storage capacity of the storage section 18 is so set as to enable at least page-based, simultaneous storage of the first piece of or the second piece of image data and selection data, and the page division number is set at 1.

In the case of stripe-based processing, the division number may be set at any number. A change in division number does not change the contents of a restored image. Although in the above embodiments output is made in the form of stripe images, composing may be performed after development into a page-based image is made in the image conversion section 17, for example. Further, where a color image is output, an output device may be of a point-sequential device in which values of respective color components should be input on a pixel-by-pixel basis or of a plane-sequential device in which pixel values of each color component should be input consecutively. A configuration is possible in which such a data rearrangement process is executed in the image conversion section 17, for example.

The method of separating an original image into a text color image, a pattern image, and selection data and the image forms after the separation are not limited to those in the above embodiments. Any separation method and separated formed can be employed as long as an original image is separated into two kinds of image data and data indicating pixels of which of the two kinds of images should be selected. Further, the format of code data as multiplexed data of compressed codes is not limited to the formats shown in FIGS. 4 and 5.

Figure 14:
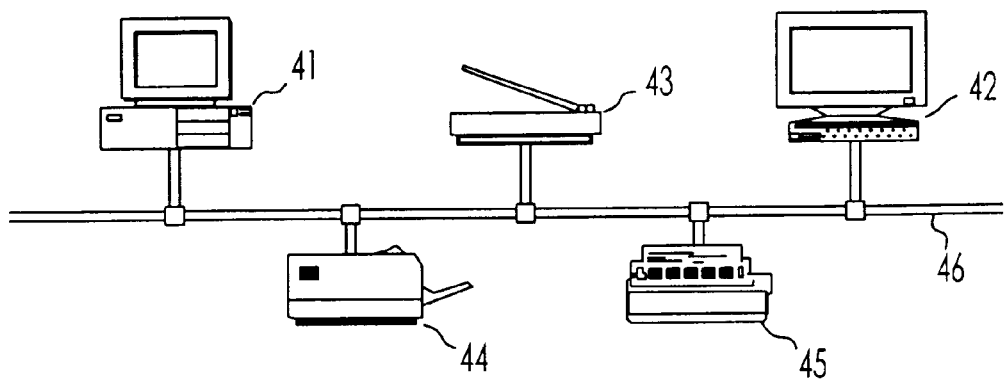
FIG. 14 shows a system configuration of a first application example of an image processing apparatus according to the invention.

FIG. 14 shows a system configuration of a first application example of an image processing apparatus according to the invention. In FIG. 14, [reference numeral] 41 denotes a personal computer; 42, a workstation; 43 . . . Scanner; 44 and 45, printers; and 46, a LAN. In the example of FIG. 14, the personal computer 41, the workstation 42, the scanner 43, the printers 44 and 45, etc. are connected to the LAN (local area network) 46. Naturally, other devices may be connected [to the LAN 46], or connection may be made to another LAN, a public line, or the like.

In the above system, for example, code data is transmitted from the personal computer 41 or the work station 42 to the printer 44 or 45, or from the scanner 43 to the personal computer 41 or the workstation 42 or to the printer 44 or 45. In this case, an image can be transmitted with high image quality at high speed by separating it into a first piece of image data, a second piece of image data, and selection data and transmitting those data after compressing those by methods that are most suitable for the respective data.

For example, the printers 44 and 45 that receive transmitted code data can be equipped with an image processing apparatus of the invention. In printing received code data in the printer 44 or 45, an image can be formed on a recording medium by converting the code data into a raster image that enables printout by using the image processing apparatus of the invention. The personal computer 41 and the workstation 42 can also be equipped with the image processing apparatus of the invention. In displaying received code data on a display device in the personal computer 41 or the workstation 42, an image can be displayed by converting the code data into a raster image that enables display by using the image processing apparatus of the invention. In either case, an image of high image quality can be composed correctly and then output.

Figure 15:
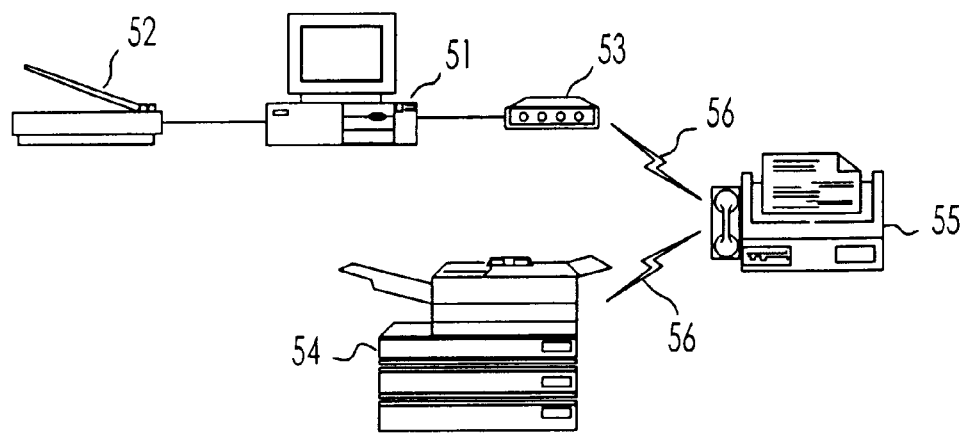
FIG. 15 shows a system configuration of a second application example of an image processing apparatus according to the invention.

FIG. 15 shows a system configuration of a second application example of an image processing apparatus according to the invention. In FIG. 15, [reference numeral] 51 denotes a personal computer; 52, a scanner; 53, a modem; 54, a multi-functional copier; 55, a facsimile terminal; and 56, a public line. This example is directed to a case of transmitting an image via a public line.

The scanner 52 for inputting an image and the modem 53 or the like for connecting the personal computer 51 to the public line 56, and are connected to the personal computer 51. Naturally, other various devices such as a digital camera as an image input device may be connected [to the personal computer 51]. The personal computer 51 can capture an image from an image input device such as the scanner 52, and perform image processing, image editing, or the like if necessary. The personal computer 51 can also generate an image by using a graphics function or the like.

An image generated by the personal computer 51 in the above manner can be transmitted to a facsimile terminal located at a remote place via the public line 56 by using the modem 53. In this case, an image can be transmitted with high image quality at high speed by separating it into the first piece of image data, the second piece of image data, and selection data and transmitting those data as code data obtained by compressing those data by methods that are most suitable for the respective data.

In recent years, multi-functional copiers having a communication function have been developed in attempts of increasing the functions of a copier. It becomes possible to transmit an image with high image quality at high speed by providing such a multi-functional copier 54 with a function (as part of the communication function) of separating an image into the first piece of image data, the second piece of image data, and selection data and transmitting those data as code data obtained by compressing those data by methods that are most suitable for the respective data. In the example being described, the multi-functional copier 54 transmits an image to the facsimile terminal 55 via the communication line 56.

The facsimile terminal 55 receives code data from the personal computer 51 or the multi-functional copier 54 via the public line 56. The facsimile terminal 55 that receives code data may be equipped with an image processing apparatus of the invention. In printing received code data, the code data can be converted into a raster image that enables printout by using the image processing apparatus of the invention. Naturally, the personal computer 51 and the multi-functional copier 54 may be equipped with an image processing apparatus of the invention so that code data obtained by separating an image into the first piece of image data, the second piece of image data, and selection data can be transmitted between those devices.

As described in the above first and second application examples, the image processing apparatus of the invention can be implemented irrespective of the transmission path, the form of a device that receives code data, and the output destination of a code-data-converted raster image. The image processing apparatus of the invention can be applied to a system that does not transmit code data unlike the first and second application examples, but that stores images and picks up [any of] those images at an arbitrary time point like an image filing apparatus. In this case, images of high image quality can be stored in a storage area of a small capacity, enabling a small system configuration. Naturally, the image processing apparatus of the invention can be applied to a system in which transmission and storage are combined together.

As is apparent from the above description, the invention allows an image to be composed and restored based on code data, that is, first compressed data generated by compressing the first piece of image data, second compressed data generated by compressing second piece of image data that is different from the first piece of image data, and third compressed data generated by compressing selection data to be used for making a selection between the first piece of image data and the second piece of image data that are transmitted sequentially on a page-by-page basis or a stripe image basis (stripe images are generated by dividing a page in the auxiliary scanning direction). As a result, an image of high image quality can be transmitted at high speed and the image storage capacity can be reduced. The invention provides another advantage that an image can be composed correctly even if corresponding pixels of respective compressed data are not received at the same time when such a code data is transmitted.

What is claimed is:

1. An image processing apparatus comprising:

input means for inputting first compressed data generated by compressing a first piece of image data, second compressed data generated by compressing a second piece of image data that is different from the first piece of image data, and third compressed data generated by compressing selection data to be used for making a selection between the first piece of image data and the second piece of image data;

storing means for storing the first compressed data, the second compressed data, and the third compressed data that have been input by said input means;

expanding means for reading out, from said storing means, the first compressed data, the second compressed data, and the third compressed data that are stored in said storing means, and for expanding the compressed data individually into first expanded data, second expanded data, and third expanded data, respectively; and image processing means for executing at least an image composing process based on the respective expanded data that have been generated by said expanding means through expansion.

2. An image processing apparatus comprising:

input means for inputting first compressed data generated by compressing a first piece of image data, second compressed data generated by compressing a second piece of image data that is different from the first piece of image data, and third compressed data generated by compressing selection data to be used for making a selection between the first piece of image data and the second piece of image data;

expanding means for individually expanding the first compressed data, the second compressed data, and the third compressed data that have been input by said input means into first expanded data, second expanded data, and third expanded data, respectively;

storing means for storing the respective expanded data that have been generated by said expanding means through expansion; and image processing means for reading out the respective expanded data that are stored in said storing means, and for executing at least an image composing process based on the respective expanded data.

3. An image processing apparatus comprising:

input means for inputting first compressed data generated by compressing a first piece of image data, second compressed data generated by compressing a second piece of image data that is different from the first piece of image data, and third compressed data generated by compressing selection data to be used for making a selection between the first piece of image data and the second piece of image data;

expanding means for individually expanding the first compressed data, the second compressed data, and the third compressed data that have been input by said input means into first expanded data, second expanded data, and third expanded data, respectively;

image converting means for executing image conversion processes on the respective expanded data that have been generated by said expanding means through expansion;

storing means for storing the respective expanded data that have been subjected to the image conversion processes by said image converting means; and composing means for reading out the respective expanded data that are stored in said storing means and have been subjected to the image conversion processes by said image converting means, and for executing an image composing process based on the respective expanded data that have been subjected to the image conversion processes.

4. The image processing apparatus of claim 1, wherein said storing means comprises a storage medium having a storage capacity of at least one page.

5. The image processing apparatus of claim 2, wherein said storing means comprises a storage medium having a storage capacity of at least one page.

6. The image processing apparatus of claim 3, wherein said storing means comprises a storage medium having a storage capacity of at least one page.

7. The image processing apparatus of claim 1, wherein said storing means comprises a storage medium having a storage capacity of less than one page for synchronization between respective data.

8. The image processing apparatus of claim 2, wherein said storing means comprises a storage medium having a storage capacity of less than one page for synchronization between respective data.

9. The image processing apparatus of claim 3, wherein said storing means comprises a storage medium having a storage capacity of less than one page for synchronization between respective data.

10. An image processing apparatus comprising:

input means for inputting first compressed data generated by compressing a first piece of image data, second compressed data generated by compressing a second piece of image data that is different from the first piece of image data, and third compressed data generated by compressing selection data to be used for making a selection between the first piece of image data and the second piece of image data;

expanding means for individually expanding the first compressed data, the second compressed data, and the third compressed data that have been input by said input means into first expanded data, second expanded data, and third expanded data, respectively;

storing means; and composing means for combining the first expanded data and the second expanded data by using the third expanded data while reading out the third expanded data from said storing means after temporarily storing the third expanded data that has been generated by said expanding means through expansion in said storing means, to thereby form a composed image on said storing means.

11. The image processing apparatus of claim 10, wherein said composing means causes the second expanded data or the first expanded data to selectively overwrite the first expanded data or the second expanded data that is stored in said storing means by using the third expanded data after storing the first expanded data or the second expanded data in said storing means, to thereby form the composed image.

12. The image processing apparatus of claim 10, further comprising:

image converting means for executing image conversion processes on the respective expanded data that have been generated by said expansion means through expansion, wherein the first expanded data, the second expanded data, and the third expanded data that have been subjected to the image conversion processes by said image converting means are passed to said composing means.

13. An image processing apparatus comprising:

input means for inputting first compressed data generated by compressing first stripe image data, second compressed data generated by compressing second stripe image data that is different from the first stripe image data, and third compressed data generated by compressing stripe selection data to be used for making a selection between the first stripe image data and the second stripe image data;

storing means for storing the first compressed data, the second compressed data, and the third compressed data that have been input by said input means;

expanding means for reading out, from said storing means, the first compressed data, the second compressed data, and the third compressed data that are stored in said storing means, and for expanding the compressed data individually into first expanded data, second expanded data, and third expanded data, respectively; and image processing means for executing at least an image composing process based on the respective expanded data that have been generated by said expanding means through expansion.

14. An image processing apparatus comprising:

input means for inputting first compressed data generated by compressing first stripe image data, second compressed data generated by compressing second stripe image data that is different from the first stripe image data, and third compressed data generated by compressing stripe selection data to be used for making a selection between the first stripe image data and the second stripe image data;

expanding means for individually expanding the first compressed data, the second compressed data, and the third compressed data that have been input by said input means into first expanded data, second expanded data, and third expanded data, respectively;

storing means for storing the respective expanded data that have been generated by said expanding means through expansion; and image processing means for reading out the respective expanded data that are stored in said storing means, and for executing at least an image composing process based on the respective expanded data.

15. An image processing apparatus comprising:

input means for inputting first compressed data generated by compressing first stripe image data, second compressed data generated by compressing second stripe image data that is different from the first stripe image data, and third compressed data generated by compressing stripe selection data to be used for making a selection between the first stripe image data and the second stripe image data;

expanding means for individually expanding the first compressed data, the second compressed data, and the third compressed data that have been input by said input means into first expanded data, second expanded data, and third expanded data, respectively;

image converting means for executing image conversion processes on the respective expanded data that have been generated by said expanding means through expansion;

storing means for storing the respective expanded data that have been subjected to the image conversion processes by said image converting means; and composing means for reading out the respective expanded data that are stored in said storing means and have been subjected to the image conversion processes by said image converting means, and for executing an image composing process based on the respective expanded data that have been subjected to the image conversion processes.

16. An image processing apparatus comprising:

input means for inputting first compressed data generated by compressing first stripe image data, second compressed data generated by compressing second stripe image data that is different from the first stripe image data, and third compressed data generated by compressing stripe selection data to be used for making a selection between the first stripe image data and the second stripe image data;

expanding means for individually expanding the first compressed data, the second compressed data, and the third compressed data that have been input by said input means into first expanded data, second expanded data, and third expanded data, respectively;

storing means; and composing means for combining the first expanded data and the second expanded data by using the third expanded data while reading out the third expanded data from said storing means after temporarily storing the third expanded data that has been generated by said expanding means through expansion in said storing means, to thereby form a composed image on said storing means.

17. An image processing apparatus comprising:

input means for inputting first compressed data generated by compressing first stripe image data, second compressed data generated by compressing second stripe image data that is different from the first stripe image data, and third compressed data generated by compressing stripe selection data to be used for making a selection between the first stripe image data and the second stripe image data;

expanding means for individually expanding the first compressed data, the second compressed data, and the third compressed data that have been input by said input means into first expanded data, second expanded data, and third expanded data, respectively;

image processing means for executing at least a stripe image composing process based on the respective expanded data that have been generated by said expanding means through expansion; and page developing means for page-developing a stripe image that has been composed by said image processing means.

* * * * *